United States Patent Office 3,495,515
Patented Feb. 17, 1970

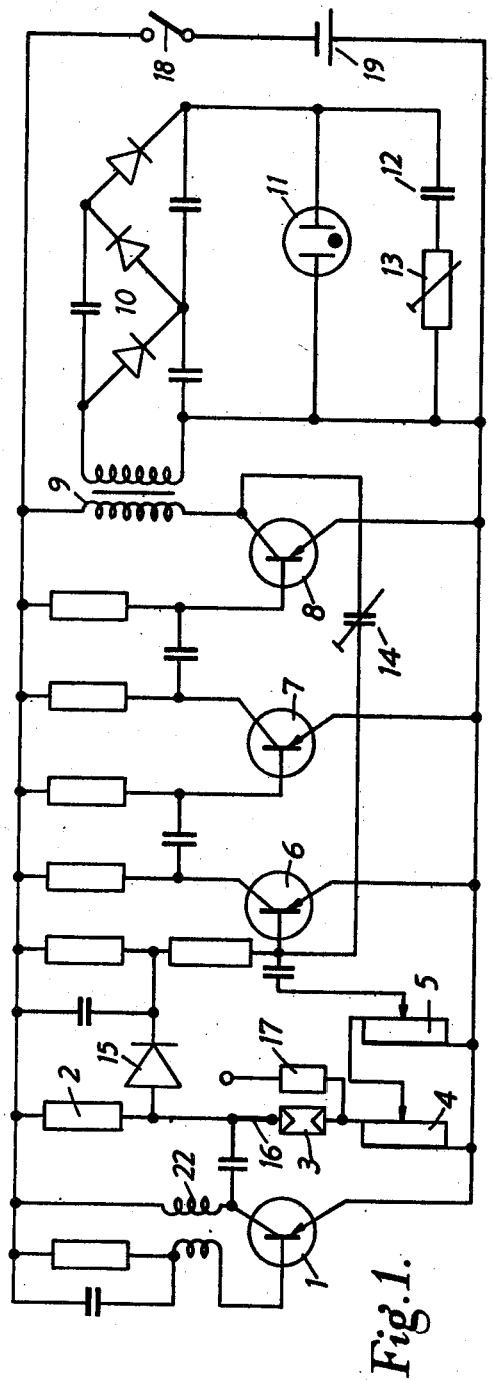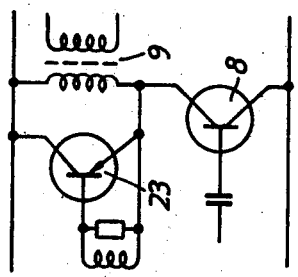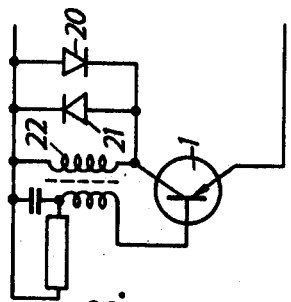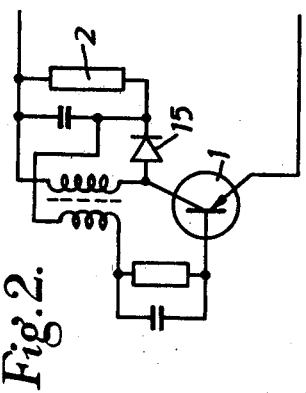

3,495,515
PHOTOELECTRIC MEASURING DEVICES
Hubertus Reimann, Dresden, Germany, assignor to VEB Pentacon Dresden Kamera- und Kinowerke, Dresden, Germany
Filed Apr. 28, 1967, Ser. No. 634,755
Int. Cl. G01j *1/46;* G03b *17/18*
U.S. Cl. 95—10                                    10 Claims

ABSTRACT OF THE DISCLOSURE

The device for indicating the suitability for exposure under prevailing light conditions comprises a circuit which includes a source of current constituted by a photoelectric cell and a potential divider preferably coupled with an exposure setting device on a camera, which source is amplified by a proportional amplifier which serves to ignite an indicating lamp. Depending upon the level of the output voltage of the amplifier the lamp will either be extinguished to indicate that the light conditions are too dark, or will glow continuously to indicate that the light is too bright, or will glow intermittently over a range in which exposure is in order.

BACKGROUND OF THE INVENTION

The invention relates to a device for the supervision of the manual electric input of exposure factors into photographic measuring apparatus, in which a light indicator is utilised in place of a measuring mechanism.

Known devices of this kind make use of a transistorised threshold value circuit, which responds only to an input signal of specific level and in the input of which there lies a light-sensitive element to which there are allocated setting members on the camera. The latter are shifted until the input signal of specific level is reached. In the output of the threshold value circuit there lies an indicator element, for example a lamp, which lights up intermittently when the said value of the input voltage is reached.

Furthermore, an electronic photometer is known, in which there are provided two lighting indicator elements controlled by an electronic circuit arrangement containing the sensitivity-variation elements, the relative lighting effect of which indicator elements indicates the correct exposure or the over- or under-exposure of the film to be exposed. In the case of under-exposure, both lighting tubes are extinguished, in the case of correct exposure one of the tubes lights up and in the case of over-exposure both light up.

The prior art also includes a brightness-indicator device which consists, on the one hand, of a control circuit with a photo-electric cell and a measuring instrument and, on the other, of a relaxation oscillator connected in parallel with this control circuit, in which case the oscillator oscillates and causes a lamp to light up intermittently when the scene brightness drops below a value which is too low for correct exposures.

The disadvantages of the known devices consist in that the said photometer has space requirements which are too great for photographic miniature appliances, and the apparatus with threshold value circuit brings one and the same light signal to indication as from and above a specific position of the setting members for diaphragm aperture and exposure time. The said device with relaxation oscillator has the disadvantage that it merely constitutes a warning apparatus for inadequate brightness conditions.

It is the purpose of the invention to make the indication of the set exposure factor combination clearer, with low space requirements.

The object of the invention consists in providing a device for the supervision, without measuring mechanism, of the manual electric input of diaphragm, film sensitivity and exposure time, by means of light signals which, with one single light indicator, gives an unequivocal indication in the whole brightness range exploitable for photographic exposures, as to whether the exposure factor combination set on the camera in each case would cause an under-exposure, an over-exposure or the correct exposure of the film. The accuracy of indication should here be largely independent of minor voltage reductions of the current source and of temperature fluctuations.

SUMMARY OF THE INVENTION

According to the invention this problem is solved due to the fact that a proportional amplifier is used, the input voltage of which is dependent upon a photo-conductive cell exposed to the scene brightness and upon the position of voltage dividers coupled with the setting members of the measuring apparatus for the diaphragm aperture, film sensitivity and shutter time, and accordingly results, according to the momentarily set exposure factor combination, in a variable output voltage which corresponds to an under-exposure, over-exposure or the correct exposure and is confirmable by means of a light indicator which shows different lighting effects in the case of different feed voltages. In case of need, between the amplifier output and the light indicator there is placed a voltage-multiplier circuit. The light indicator can be formed for example by a glow lamp, with which there is associated an RC member. In dependence upon the exposure factor combination set on the measuring apparatus in each case and corresponding to an under-exposure, correct exposure or an over-exposure, this lamp lights up either not at all or intermittently or constantly. It is, however, also possible to form the light indicator with the effect of a tuning indication tube. In order to make the said indication largely independent of the voltage condition of the battery, the amplifier is controlled with an alternating current voltage produced by a transistor oscillator, while to the base of the oscillator transistor there is conducted back a direct current voltage proportional to the delivered alternating current voltage. For the same purpose an anti-parallel connection of diodes can take place in parallel with the collector winding of the oscillator transistor. A further possibility consists in conducting to the base of the first amplifier stage a voltage which effects an increase of the amplification of the indicated stage when the battery voltage drops. Despite this voltage stabilization of the amplifier an inspection of battery voltage can be carried out in a simple way in the form where in place of the photo-conductive cell a fixed resistance can be connected in, which in combination with the voltage dividers set to minimal damping has the effect that the glow lamp blinks when the battery voltage is sufficiently high and remains dark when the battery voltage is too low.

Thus in comparison with the prior art there is produced an apparatus without measuring mechanism for photographic small appliances, such as cameras and hand exposure meters with manual setting of all exposure factors, which serves not only as warning apparatus for a specific brightness value, but also as setting aid in the entire brightness range. With space requirements which are tolerable for camera conditions, it ensures a definite supervision of the combination of exposure time, diaphragm aperture and film sensitivity set on the camera in each case, which would bring about an under-exposure, over-exposure or correct exposure of the film, with space requirements tolerable for camera conditions. Thus the setting of the exposure factors is substantially facilitated.

BRIEF DESCRIPTION OF DRAWING

The invention is to be explained in greater detail hereinafter with reference to an example of embodiment in connection with a photographic camera. In the accompanying drawing:

FIGURE 1 shows the overall circuit diagram of the supervision device;

FIGURES 2 and 3 show a circuit for the stabilization of the input voltage of the amplifier; and FIGURE 4 shows the amplifier output with damping member.

DESCRIPTION OF PREFERRED EMBODIMENTS

According to FIGURE 1, a transistor 1 is connected as alternating current voltage generator and loaded by a resistance 2, which is small in comparison with the minimum resistance value of a photo-conductive cell 3. The input voltage for a proportional amplifier consisting of transistors 6, 7 and 8, is formed by the photo-conductive cell 3, a high-frequency voltage divider 4 which is coupled with the setting members of the camera for shutter time and film sensitivity, and a further high-frequency voltage divider 5, hereinafter merely called voltage divider, which is coupled with the diaphragm setting. In the output of the amplifier there is a transformer 9, after which there is arranged a rectifier and voltage-multiplier circuit 10. 11 designates a glow lamp, parallel with which there is connected a capacitor 12 and an adjustable resistor 13. The amplifier is stabilized in feedback through a trimmer 14 and the base voltage of the transistor 6 is controlled by means of a diode 15 in dependence upon the battery voltage drop. In place of the photo-conductive cell 3 a fixed resistance 17 can be connected in through a change-over switch 16. The entire circuit can be connected to a voltage source 19 through a switch 18.

According to FIGURE 2, a direct current voltage proportional to the delivered alternating current voltage is conducted back to the base of the oscillator transistor 1.

According to FIGURE 3, two diodes 20, 21 are connected in anti-parallel circuit to the collector winding 22 of the transistor 1.

According to FIGURE 4, into the output of the amplifier there is connected a transistor 23 as damping member, the damping of which is controlled by the level of the voltage delivered by the oscillator.

The manner of operation is as follows:

Due to the setting of the voltage dividers 4 and 5 coupled with the setting members for diaphragm aperture, film sensitivity and shutter time, and of the value of the photo-conductive cell in each case, a voltage is formed which passes to the base of the transistor 6 and in the case of correct exposure always has the same value. In the case of correct setting of all exposure factors thus a correspondingly higher voltage with constant value is always applied over the glow lamp 11. At this voltage value the capacitor 12 is charged up to the burning voltage of the glow lamp, so that the latter commences to glow. Thus the capacitor 12 can discharge until falling short of the burning voltage sufficiently far so that the glow ceases. Now the capacitor 12 begins to charge up afresh until the burning voltage of the lamp 11 is reached again and the latter commences to glow again. This blinking condition, the frequency of which is selectable by means of the adjustable resistor 13, is maintained in the case of unvaried input voltage until the switch 18 is opened. The amplification of the proportional amplifier is so set by means of the trimmer 14, connected as feedback, that the described "blinking" of the glow lamp 11 occurs precisely when the set combination permits of expectation of the "correct exposure." Thus as soon as the blinking signal occurs in the camera viewfinder, the camera is set correctly according to the prevailing light conditions.

For the case where, with unvaried position of the voltage dividers 4, 5, the brightness increases and thus the resistance value of the photo-conductive cell decreases, the input voltage at the transistor 6 and accordingly the feed voltage for the glow lamp 11 reaches an excessive value, which no longer permits the intermittent lighting up of the glow lamp, but causes a "steady light" thereof. This steady light indicates to the user of the camera that photography with the set exposure factor combination would result in an "over-exposure." In order to avoid this, diaphragm aperture and/or time and thus the voltage dividers 4, 5 are adjusted until the blinking signal, the sign of the correct exposure setting, occurs.

If with the switch 18 closed the glow lamp 11 remains dark, this is a sign that for the set combination of the voltage dividers 4, 5 the resistance value of the photo-conductive cell 3 is too great as a result of low brightness, and accordingly the working voltage applied to the glow lamp is too low, so that the lighting voltage is not reached. This "dark condition" of the glow lamp thus indicates that an "under-exposure" is to be expected. For the purpose of setting of the correct exposure the voltage dividers 4, 5 again are to be shifted until the blinking of the glow lamp is reached.

Although the amplifier is already secured within wide limits against reduction of the battery voltage, the photo-conductive cell 3 can be replaced by the fixed resistance 17, through the change-over switch 16. In combination with the voltage dividers 4, 5 set to minimum damping this achieves the object that the glow lamp blinks when the battery voltage is sufficiently high and remains dark when the battery voltage is too low.

Although the invention was described above in connection with a photographic camera, the measuring apparatus according to the invention can obviously also be utilised in another photographic appliance, for example in a hand exposure meter.

I claim:

1. A device for indicating the suitability for exposure under prevailing light conditions, having a circuit comprising:
    (a) means for providing a current source,
    (b) a photoelectric cell connected with said current source and arranged to receive light from the subject to be photographed,
    (c) at least one voltage divider in circuit with said current source and photoelectric cell, said divider being settable according to an exposure factor,
    (d) a proportional amplifier having its input connected to said source which is controlled according to the resistance of the photoelectric cell to the setting of the divider, the output of said amplifier providing an output voltage corresponding to under-exposure, over-exposure or correct exposure, and
    (e) indicating light means connected to said amplifier output to provide a visual indicator of the exposure condition depending upon the level of said output voltage.

2. A device as claimed in claim 1, wherein between the amplifier output and the light indicator there is connected a voltage-multiplier circuit.

3. A device as claimed in claim 1, wherein the light indicator is formed by a glow lamp with which there is associated an RC member.

4. A device as claimed in claim 1, wherein the resistor of the RC member is variable.

5. A device as claimed in claim 1, wherein the light indicator is a tuning indicator tube.

6. A device as claimed in claim 1, wherein the measuring device is installed in a photographic camera and the light indicator is visible in the camera viewfinder.

7. A device as claimed in claim 1, wherein the amplifier is formed as alternating current voltage amplifier, where the alternating current voltage is formed by a transistor oscillator, to the base of which there is conducted back a direct current voltage proportional to the delivered alternating current voltage.

8. A device as claimed in claim 7, wherein diodes are connected in anti-parallel circuit parallel with the collector winding of the oscillator transistor.

9. A device as claimed in claim 7, wherein a bias dependent upon the voltage condition of the battery becomes effective at the base of the first amplifier stage.

10. A device as claimed in claim 1, wherein in place of the photo-conductive cell, a fixed resistance can be connected in for checking the battery voltage.

References Cited

UNITED STATES PATENTS 3,397,629   8/1968   Mori et al.

JOHN M. HORAN, Primary Examiner

J. F. PETERS, Jr., Assistant Examiner

U.S. Cl. X.R.

250—206; 356—226